US012679735B2

(12) United States Patent
Wang et al.

(10) Patent No.: US 12,679,735 B2
(45) Date of Patent: Jul. 14, 2026

(54) BIO-OIL LIGHT FRACTION-BASED BREAD-SHAPED POROUS ACTIVATED CARBON, METHOD FOR PREPARING THE SAME AND USE THEREOF

(71) Applicant: ZHEJIANG UNIVERSITY, Hangzhou (CN)

(72) Inventors: Shurong Wang, Hangzhou (CN); Yan Ding, Hangzhou (CN); Lingjun Zhu, Hangzhou (CN); Kunzan Qiu, Hangzhou (CN); Yunchao Li, Hangzhou (CN); Jingsong Zhou, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1102 days.

(21) Appl. No.: 17/739,191

(22) Filed: May 9, 2022

(65) Prior Publication Data

US 2022/0259049 A1 Aug. 18, 2022

Related U.S. Application Data

(63) Continuation of application No. PCT/CN2021/094792, filed on May 20, 2021.

(30) Foreign Application Priority Data

Dec. 23, 2020 (CN) ......................... 202011533868.X

(51) Int. Cl.
*C01B 32/33* (2017.01)
*C01B 32/39* (2017.01)

(52) U.S. Cl.
CPC .............. *C01B 32/33* (2017.08); *C01B 32/39* (2017.08); *C01P 2006/80* (2013.01)

(58) Field of Classification Search
CPC ....... C01B 32/33; C01B 32/39; C01P 2006/80
See application file for complete search history.

(56) References Cited

U.S. PATENT DOCUMENTS

| | | | | |
|---|---|---|---|---|
| 10,833,318 B2 | 11/2020 | Greer et al. | | |
| 2011/0248212 A1* | 10/2011 | Mao | ...................... | H01M 4/587 |
| | | | | 427/113 |
| 2015/0068113 A1* | 3/2015 | Conner | ..................... | C10L 5/44 |
| | | | | 204/157.43 |
| 2018/0371323 A1* | 12/2018 | Elkasabi | ................. | C10B 53/02 |

FOREIGN PATENT DOCUMENTS

| | | |
|---|---|---|
| CN | 105948042 A | 9/2016 |
| CN | 106276888 A | 1/2017 |
| CN | 106587055 A | 4/2017 |
| CN | 106698418 A | 5/2017 |
| CN | 105271220 B | 2/2018 |
| CN | 108069424 A | 5/2018 |
| CN | 108751192 A | 11/2018 |
| CN | 109081342 A | 12/2018 |
| CN | 109467085 A | 3/2019 |
| CN | 110451503 A | 11/2019 |
| CN | 111232975 A | 6/2020 |
| CN | 112713005 A | 4/2021 |

OTHER PUBLICATIONS

Chen Jian, et al., Preparation of Hierarchically Porous Carbon from Biomass Tar for Carbon Dioxide Adsorption, Advances in New and Renewable Energy, 2019, pp. 233-240, vol. 7, No. 3.
Yixi Liu, Research on Characteristics of Bio-oil Separation and its Fractions Based on Molecular Distillation, Zhejiang University Master's Thesis, 2020, pp. 1-54.

* cited by examiner

*Primary Examiner* — Stuart L Hendrickson
(74) *Attorney, Agent, or Firm* — Bayramoglu Law Offices LLC

(57) ABSTRACT

A bio-oil light fraction-based bread-shaped porous activated carbon, a method for preparing the same and use thereof are provided. A light fraction prepared by fast pyrolysis of a biomass coupled with molecular distillation is selected as a precursor; an activator is directly mixed with the light fraction and stirred to obtain a homogeneous liquid; then, the homogeneous liquid is subjected to one-step carbonization and activation at a two-stage temperature in an inert atmosphere; after the activation, the obtained solid was washed and filtered, the activator reaction products and impurities are removed, and then dried to obtain the activated carbon used as an electrode carbon material of a supercapacitor. The method fully utilizes the rich micromolecule compounds such as water, acids, ketones, aldehydes, monophenols and the like in the obtained light fraction, and the micromolecule compounds and water can interact with the activator.

17 Claims, 7 Drawing Sheets dA/dW Surface area vs. Pore diameter

BIO-OIL LIGHT FRACTION-BASED BREAD-SHAPED POROUS ACTIVATED CARBON, METHOD FOR PREPARING THE SAME AND USE THEREOF

CROSS REFERENCE TO THE RELATED APPLICATIONS

This application is a Continuation Application of International Application No. PCT/CN2021/094792, filed on May 20, 2021, which is based upon and claims priority to Chinese Patent Application No. 202011533868.X, filed on Dec. 23, 2020, the entire contents of which are incorporated herein by reference.

TECHNICAL FIELD

The present application relates to the field of high-value utilization of a biomass pyrolyzed bio-oil molecular distillation light fraction, in particular to a bio-oil light fraction-based bread-shaped porous activated carbon and a method for preparing the same and use thereof.

BACKGROUND

Activated carbon (AC) is often used as the most commonly used electrode material of an electric double layer supercapacitor (EDLC) because of its large specific surface area and porosity which is very matched with the ion size. Activated carbon prepared from biomass as a carbon source has the advantages of a high conductivity, chemical stability in water system and organic electrolytes, a low cost and abundant sources. It is one of the best carbon materials at present, and has very good application value in supercapacitors and other fields.

In the conventional process of preparing activated carbon, activators and precursors were usually mixed in solid-solid, solid-liquid and solid-gas states, in which solid-solid mixing refers to directly mixing solid precursors or unactivated coarse carbon with solid activators by a mechanical force. For example, in patent CN202010095842.5, pomelo core powder is carbonized to obtain a coarse carbon material, and the coarse carbon material and an alkali activator (a mass ratio is 1-2:1-2) were mixed under grinding, and then activated to prepare a carbon material for a supercapacitor electrode. Under the action of mechanical force stirring, the solid precursor and the solid activator can only be uniformly mixed on the macro level, but can not be uniformly mixed on the micro-molecular level, so it is necessary to significantly increase the amount of activator. Moreover, the final product activated carbon has uneven distribution of micro pores, mostly in the form of mesopores (2-50 nm) and macropores (>50 nm), which is not suitable for being used as the electrode active material of supercapacitors.

"Solid-liquid mixing" refers to mixing a solid precursor or unactivated coarse carbon with an activator solution. For example, in the patent CN201610300981.0, solid biomass materials, such as starch, lignin, corncob, rice husk, wheat ears, etc., were mixed with a KOH solution, then the modified precursor is obtained by ultrasonic vibration and stirring, and then the activator and precursor were obtained by thermal drying or freeze drying, and then the carbon material used in the supercapacitor electrode is prepared by activation. In the drying process of mixing the precursor and activator in this way, the activator will be saturated and precipitated from the aqueous solution and appear on the surface of the precursor in the form of a solid, which can not achieve uniform mixing at the micro-molecular level, and will increase the amount of activator.

"Solid-gas" mixing means that a solid precursor or unactivated crude carbon is put into an activation furnace, and then active gases such as water vapor, carbon dioxide, air, ammonia gas, etc. were introduced. For example, the patent CN201810885112.8 uses biomass such as coniferous wood and broad-leaved wood as primary materials, which were activated by the first and second gases to prepare carbon materials for supercapacitor electrodes. In the activation process of this kind of method, the active gas is only activated with the surface of the precursor, and a large amount of active gas needs to be continuously introduced in a high temperature environment above 800° C. for a long time, resulting in a large amount of energy consumption and waste of active gas. Moreover, the pore distribution of the obtained activated carbon is uneven, and the specific surface area is generally lower than 1000 $m^2/g$, so it is not suitable for being used as the electrode active material of supercapacitors.

Activation of a precursor and an activator after mixing in solid-solid, solid-liquid and solid-gas forms has the following disadvantages: (1) the activator can not fully contact with the precursor, resulting in uneven mixing; (2) because the activator and precursor cannot form a uniform mixture, the pore distribution in the activated carbon product is not uniform, and the pore size distribution is not uniform, which is widely distributed in the mesoporous and macroporous range; (3) using a large amount of the activator, the mass of the activator is usually several times higher than that of the precursor, for example, in patent CN201910824987.1, the mass ratio of a carbonized material based on bamboo shoot shells to an activator is 1:3-5 or higher. Therefore, it is necessary to invent a method to uniformly mix the activator and precursor, which can not only reduce the amount of the activator, but also prepare an activated carbon material with uniform pore distribution.

Although there were some literatures on the preparation of activated carbon by a "liquid-liquid" method, for example, the journal paper "Study on preparation of porous carbon from biomass tar and carbon dioxide adsorption performance thereof" reported that porous carbon with a developed pore structure was prepared by one-step simple activation with biomass tar as a precursor and $ZnCl_2$ as an activator. This method uses a high dose of a salt activator (the mass ratio of biomass tar to $ZnCl_2$ is 1:4), which is not conducive to environmental protection and economy. Similarly, a large number of macromolecular compounds with a long carbon chain and a large molecular weight, such as pyrolytic lignin, aromatic polymer, anthracene, phenolic polymer, sugar, etc., in biomass tar, will be precipitated by condensation polymerization during the process of stirring and heating, and condensation polymers will easily agglomerate with the activator, resulting in uneven pore distribution of the carbon product, increasing the amount of the activator, wasting the activator and increasing production costs.

At the same time, the activated carbon prepared by the above method contains a certain amount of ash, and almost all the ash in activated carbon comes from raw materials. The influence of ash on its preparation, pore structure and electrochemical performance is mainly as follows: (1) ash will increase the amount of the activator and heat energy consumption in the process of preparing activated carbon; (3) the existence of ash will reduce the specific surface area and pore volume of the activated carbon material; (4) using activated carbon with a high ash as a material of a supercapacitor electrode will increase the leakage current of a capacitor, a diffusion resistance of electrolyte ions and an electron transfer resistance, enhance the self-discharge of the capacitor and destroy the electrochemical stability of the capacitor. Therefore, it is necessary to select a suitable deashing method in raw materials and preparation process. For example, the patent CN109467085A takes biomass with a high ash as a raw material, and adopts a hydrothermal carbonization process to reduce the ash in the raw material, but it cannot completely remove the ash in activated carbon; the patents CN109467085A, CN108069424A, CN105271220B, etc. adopt different methods to reduce the ash in the activated carbon of crops and plants, but their contents were all about 1%-5%.

SUMMARY

The purpose of the present application is to solve the problems in the prior art, and to propose a bio-oil light fraction-based bread-shaped porous activated carbon, and a method for preparing the same and use thereof. The method can reduce the amount of an activator, reduce the corrosion of the equipment, is environment-friendly, and can obtain bread-shaped porous activated carbon with a large specific surface area and a uniform pore distribution without ash.

In order to achieve the above goal, the present application provides a bio-oil light fraction-based bread-shaped porous activated carbon, which includes the following steps: carrying out molecular distillation on pyrolyzed bio-oil to obtain a light fraction, wherein the light fraction is in a liquid phase; using the light fraction as a carbon precursor mixing an activator with the light fraction, wherein the activator is a water-soluble activator; mixing the light fraction with the activator to form a mixed solution, and carbonizing and activating the mixed solution to obtain the bio-oil light fraction-based bread-shaped porous activated carbon.

Bio-oil can be obtained by rapid pyrolysis of biomass at a high temperature. However, bio-oil has complex components, a poor thermal stability, tendency to polymerization and coking reactions, and some conventional separation technologies such as atmospheric distillation and vacuum distillation were difficult. For example, macromolecular compounds, such as sugars, which were easy to undergo polycondensation and were not conducive to the mixing of activators, remain in the bio-oil-water phase (light) obtained by conventional normal-pressure water extraction; the water content of the obtained product is low and can not be mixed with water-soluble activator when a nonpolar extractant is used for extraction followed by distilling at an atmospheric pressure. High-temperature distillation can cause coking of bio-oil and can not separate macromolecular compounds which were prone to polymerization; decompression distillation can also significantly reduce the water content in the distillate.

In the present application, the molecular distillation technology is adopted to treat pyrolyzed bio-oil. Molecular distillation mainly depends on the mean free path of different compounds. The mean free path is related to temperature, effective molecular diameter and the pressure between the evaporation surface and condensation surface. Based on the difference of the mean free paths of different molecules, light molecules with smaller molecular size and molecular weight were easier to be distilled out through the distance between the evaporation surface and condensation surface than heavy molecules with a larger molecular size and molecular weight, so as to obtain light fractions, while heavy molecules (heavy components of bio-oil) that do not reach the condensation surface were collected as residual fractions to realize the graded utilization of bio-oil. Bio-oil can be separated into light and heavy fractions by molecular distillation. The heavy fraction is mainly used to prepare furan, benzene, toluene and other platform compounds. The light fraction mainly contains small molecular compounds such as acids, ketones, aldehydes, monophenols, etc., with a water content of up to 50%. Its low calorific value, low pH value and high oxygen content easily lead to equipment corrosion. Ester fuel, hydrogen and bio-gasoline were usually prepared by subsequent processes such as catalytic esterification, catalytic reforming, catalytic cracking and catalytic hydrogenation.

The present application makes full use of the large amount of water, acids, ketones, aldehydes, monophenols and other small molecules in the light fraction by mixing it with a water-soluble activator to produce activated carbon in a "liquid-liquid" way. Water-soluble activators such as active metal alkalis and salts can be dissolved in the water of the light fraction, so that under the condition of full magnetic stirring, a homogeneous mixture of carbon precursors, water molecules and activators were formed, while playing the function of these small molecule compounds of forming hydrogen bonds with water molecules (polar molecules) due to the fact that these small molecule compounds were mostly polar molecules and contain oxygen atoms, so as to achieve the characteristics of mutual co-dissolution, etc., and realize the full mixing of carbon-making raw materials and activators. At the same time, these small molecules were not subject to condensation reactions and can significantly reduce the amount of activator. More importantly, biomass is pyrolyzed rapidly to obtain bio-oil, and then the light fraction obtained by the molecular distillation technology does not contain any ash, and all the ash in biomass is left in the carbon generated after biomass pyrolysis, and a very small amount remains in the heavy fraction of molecular distillation. Therefore, using the light fraction of bio-oil molecular distillation as the precursor to prepare activated carbon can solve the problem of completely removing ash from raw materials.

Preferably, the carbonization and activation is multi-stage heating, and the mixed solution is subjected to one-step carbonization and activation.

Preferably, the carbonization and activation is two-stage heating, and the mixed solution is subjected to one-step carbonization and activation. At a low temperature stage, carbonyl, aldehyde, hydroxyl and other small molecular compounds in the light fraction were slowly decomposed to produce carbon dioxide and water. When these products volatilize into an inert gas flow from the precursor, on the one hand, they promote the porous bread-shaped structure, on the other hand, they further realize the physical activation of activated carbon. In a high temperature stage, the porous bread-shaped structure is fixed, and the activator in the precursor decomposes and reacts with carbon in this stage to further realize chemical activation.

Preferably, the mixed solution is stirred by a magnetic stirrer to obtain a uniform mixed solution.

Preferably, the method specifically- includes the following steps:

S1, firstly, preparing biomass fast pyrolyzed bio-oil, carrying out molecular distillation on the pyrolyzed bio-oil to obtain the light fraction, then mixing the activator with the light fraction according to a certain mass ratio and stirring for a certain time to obtain a mixed homogeneous liquid of the light fraction and the activator, subjecting the homogeneous liquid to two-stage heating and one-step carbonization and activation under the protection of an inert gas, and cooling to room temperature to obtain the bio-oil light fraction-based bread-shaped porous activated carbon containing impurities;

S2, grinding the product obtained in step S1 and sieving for the first time, washing and stirring with a hydrochloric acid solution, then repeatedly washing and suction filtering with deionized water until the filtrate is neutral, so as to remove activator reaction products and impurities in the solid product, drying, grinding again and sieving for the second time, and obtaining the bio-oil light fraction-based bread-like porous activated carbon.

Preferably, the light fraction is obtained by preparing pyrolyzed bio-oil from a cellulose biomass by fast pyrolysis and then subjecting the pyrolyzed bio-oil to molecular distillation.

Preferably, the cellulose biomass is one or more of fruit shell, sawdust, straw, bamboo, walnut shell, poplar sawdust and corn straw.

Preferably, in the molecular distillation, a molecular distillation pressure of 10-3000 Pa, a working pressure of short-range distiller of 0.001-1 mbar and a molecular distillation temperature of normal temperature to 200° C. were adopted to obtain different bio-oil fractions, and the light fraction is taken as the precursor for the preparation of activated carbon. Molecular distillation of the bio-oil is operated in a distillation system with high vacuum and low temperature.

Preferably, the light fraction includes the following components in parts by mass: 15-50% of water, 20-30% of acids, 5-15% of ketones, 5-10% of aldehydes, 10-20% of monophenols and other small molecular compounds, and does not contain pyrolytic lignin, aromatic polymers, anthracene, phenolic polymers, sugars and other macromolecular compounds with long carbon chains and relatively high molecular weights, and is free of ash.

Preferably, the activator is a solid water-soluble active metal alkali or a solid water-soluble active metal salt.

Preferably, the activator is one or more of potassium hydroxide, sodium hydroxide, potassium carbonate, sodium carbonate, potassium bicarbonate and sodium bicarbonate.

Preferably, a mass ratio of the activator to the light fraction is 1:22 to 1:3.

Preferably, the mixed homogeneous liquid of the light fraction and the activator in step S1 is obtained by adding the activator with a certain mass ratio to the light fraction, quickly sealing the container, and stirring for 0.5-2 hours with a magnetic stirrer to obtain a homogeneous mixture.

Preferably, in step S1, the inert gas is one or more of nitrogen, argon and helium.

Preferably, the specific steps of the two-stage heating activation described in step S1 are: a first stage has a final heating temperature of 300-500° C., a heating rate of 2-10° C./min, a heating time of 0.5-3 h, and a second stage has a final heating temperature of 700-900° C., a heating rate of 2-10° C./min, and a heating time of 1-3 h. The carbonyl group, aldehyde group and hydroxyl group in small molecular compounds in the light fraction were slowly decomposed at a low temperature stage (300-500° C.) to produce carbon dioxide and water. When these products volatilize into an inert gas flow from the precursor, on the one hand, they promote the porous bread-shaped structure, on the other hand, they further realize the physical activation of activated carbon, in a high temperature stage (700-900° C.), the porous bread-shaped structure is fixed, and the activator in the precursor decomposes and reacts with carbon in this stage, further realizing chemical activation.

Preferably, in step S2, after the first sieving, the product is washed with 0.5-2 M hydrochloric acid solution, stirred by a magnetic force for 3-6 hours, then repeatedly washed with deionized water and filtered with suction. In step S2, two grindings were both performed by a ball mill, and drying is performed in a ventilated drying oven for 10-12 hours, and the mesh number of the first sieving is smaller than that of the second sieving.

Preferably, the present application also provides a bio-oil light fraction-based bread-shaped porous activated carbon prepared by the preparation method, wherein the bio-oil light fraction-based bread-shaped porous activated carbon has a three-dimensional porous structure, a density of 0.01-0.03 g/cm$^3$, a specific surface area of 1,000-3,000 m$^2$/g, a pore volume of 0.5-1.5 cm$^3$/g and an average pore diameter of 1.8-1, and is free of ash. In a three-electrode test system, the mass-specific capacitance of the materials in an aqueous electrolyte with 6 M KOH and 1 M H$_2$SO$_4$ is 80-770 F/g, and in a button-type two-electrode supercapacitor of CR2025, the mass-specific capacitance of the material with 6 M KOH as an electrolyte is 80-240 F/g. In a 6 M KOH aqueous electrolyte system, the mass-specific capacitance decays slowly with the increase of the current intensity. In the three-electrode system, the specific capacitance at 1 A/g is 192 F/g, and the specific capacitance at 100 A/g is 148 F/g. After the current density is increased by 100 times, the attenuation rate of the mass-specific capacitance is lower than 25%.

In addition, the present application also provides use of the bio-oil light fraction-based bread-shaped porous activated carbon prepared by the preparation method, and the bio-oil light fraction-based bread-shaped porous activated carbon is used for preparing electrode active materials of supercapacitors.

The present application provides a unified and simple preparation method, that is, one-step carbonization and activation treatment at two temperature stages is carried out on the light fraction prepared by rapid pyrolysis of biomass coupled with molecular distillation, and through the interaction between the light fraction and water-soluble activator at the molecular level, the activator is dissolved in the water of the light fraction, thus reducing the dosage of the activator, reducing the corrosion of the equipment, being environment-friendly, and obtaining a bread-shaped porous activated carbon with a large specific surface area, a uniform pore distribution and free of ash. Because of the excellent electrochemical performance, a high specific capacitance in an aqueous electrolyte, a high specific capacitance at high current density and a good cycle stability, it can be further used as electrode active material of supercapacitors.

The present application has the following advantages:

I. The present application adopts the light fraction prepared by coupling molecular distillation of bio-oil prepared by rapid pyrolysis of biomass as a raw material, and regarding the light fraction:

1) It contains 15-50% water.

2) It contains small molecular compounds such as acids (20-30%), ketones (5-15%), aldehydes (5-10%), monophenols (10-20%), etc., and has a high content of oxygen (30-60%), which can form hydrogen bonds with water molecules (polar molecules) to achieve mutual co-dissolution. Water-soluble activators, such as active metal alkalis and salts, can be dissolved in water of the light fraction, so that under the condition of full magnetic stirring, a homogeneous mixture of carbon precursors, water molecules and activators can be formed, and these small molecular compounds will not undergo polycondensation reaction. The amount of the activator can be significantly reduced.

3) it does not contain macromolecular compounds with a long carbon chain and a large molecular weight, such as pyrolytic lignin, aromatic polymer, anthracene, phenolic polymer and sugar, and there is no possibility of agglomeration with the activator.

4) It does not contain ash, which reduces the amount of the activator and heat energy consumption in the process of preparing the activated carbon; the specific surface area and pore volume of the activated carbon material is improved; the leakage current, diffusion resistance and electron transfer resistance of electrolyte ions is reduced when the product of the activated carbon is used as a supercapacitor, the self-discharge of the capacitor is reduced and the electrochemical stability of the capacitor is improved.

5) Generally, oil contains almost no water and 0.08-1.82 wt % O. The main components were carbon insoluble in water and hydrocarbons formed by hydrogenation; however, the heavy fraction of the bio-oil only contains 0.1 % wt of water and 1 wt % of oxygen, and its material components were mainly macromolecular compounds with a long carbon chain, a large molecular weight and easy polymerization, such as pyrolytic lignin, aromatic polymer, anthracene, phenolic polymer and sugar, which have a high viscosity (20-200 cSt, 40° C.) and look like semi-solid viscous asphalt. On the other hand, the substances in the light fraction contain more oxygen-containing functional groups, which release small molecules such as water and $CO_2$ during carbonization and activation. On the one hand, it can effectively reduce the amount of the activator, and on the other hand, it can promote the formation of the unique porous bread shape. Neither the heavy fraction of the bio-oil nor the bio-oil obtained by direct pyrolysis of petroleum and biomass can achieve this effect.

The master's thesis "Separation of bio-oil based on molecular distillation and study on product characteristics" involves molecular distillation of bio-oil and utilization of residual fractions, wherein the residual fractions were carbonized to prepare electrode materials for supercapacitors. The residual fractions of bio-oil molecular distillation, that is, the heavy fractions of bio-oil molecular distillation, were characterized by an extremely low water content, a poor fluidity, semi-solid at a normal temperature (similar to semi-solid asphalt), and a small amount of ash (<1%), mainly containing polyphenol polymers such as diphenols (2-10%), long-chain methyl carboxylate (20-30%) and sugar (15-25%). No small molecules of acids, ketones, aldehydes and monophenols were found in GC-MS detection, and there were obvious differences in composition from the light fraction used in this application. Moreover, the residual fraction has a low water content and a poor fluidity, so it can not be directly mixed with the activator at all, and can not achieve the effect of uniformly mixing the activator with the light fraction in the present application. In this master's thesis, the residual fraction is directly carbonized at 600-1000° C. and kept at a constant temperature for 1 hour, which is different from the two-stage temperature activation in this application. In this paper, no activator is used in the activation process, and the specific surface area of carbonized products is extremely low, almost without any pores, so the products do not belong to the category of activated carbon, which is different from the bread-shaped porous activated carbon obtained in the present application, and there is no innovative conflict with the present application, and the specific capacitance of this carbon material in electrode carbon for supercapacitors is only 8.8-25.8 F/g, which is significantly lower than that of the bread-shaped porous activated carbon prepared by distilling light fraction of bio-oil molecules used in the present application as supercapacitors. In this paper, the range of representation parameters such as the appearance and morphology of carbonized products prepared is also not stated.

II. In the present application, a small amount of water-soluble alkali or salt such as potassium hydroxide, sodium hydroxide, potassium carbonate, sodium carbonate, potassium bicarbonate, sodium bicarbonate, etc. is used as activator, which can be fully dissolved in water of light fraction, and water molecules (polar molecules) form hydrogen bonds with most small molecular oxygen-containing compounds (polar molecules) in light fraction, so that under the condition of full magnetic stirring, carbon precursor, water molecules and. activator were mutually dissolved. The physical properties (fluidity, density, viscosity) and chemical composition of the carbon precursor were significantly different from those of biomass, biomass tar, biomass crude oil and heavy fraction used in the above-mentioned patents, periodicals and dissertations. These substances can not replace the light fraction of bio-oil molecular distillation used in the present application as the precursor and can be used to prepare bread-shaped porous activated carbon with a small amount of activator, as well as its various characteristics.

III. In this application, activated carbon is prepared by one-step carbonization and activation in two heating stages. The advantages were that carbonyl, aldehyde and hydroxyl groups in small molecular compounds in light fraction were slowly decomposed at low temperature stage (300-500° C.) to generate carbon dioxide and water. When these products volatilize into inert gas flow from the precursor, on the one hand, they promote the porous bread-shaped structure, on the other hand, they further realize the in-situ physical activation of activated carbon; In the high temperature stage (700-900° C.), the porous bread-shaped structure is further fixed, and the activator in the precursor decomposes and reacts with carbon in this stage, further realizing chemical activation, and obtaining bread-shaped porous activated carbon with a large specific surface area and a uniform pore distribution.

IV. The bio-oil light fraction-based bread-shaped porous activated carbon of prepared in the present application has the characteristics of a bread-shaped structure, a large specific surface area, a uniform pore distribution, no ash and the like. The prepared activated carbon is used as the electrode energy storage active material of supercapacitor, which has excellent electrochemical performance.

V. The method has the advantages of simple steps, easy operation, obvious effect, small amount of activator, environmental friendliness, low corrosion to equipment and good application prospect.

The features and advantages of the present application will be described in detail by means of examples and drawings.

DETAILED DESCRIPTION OF THE EMBODIMENTS

Figure 1:
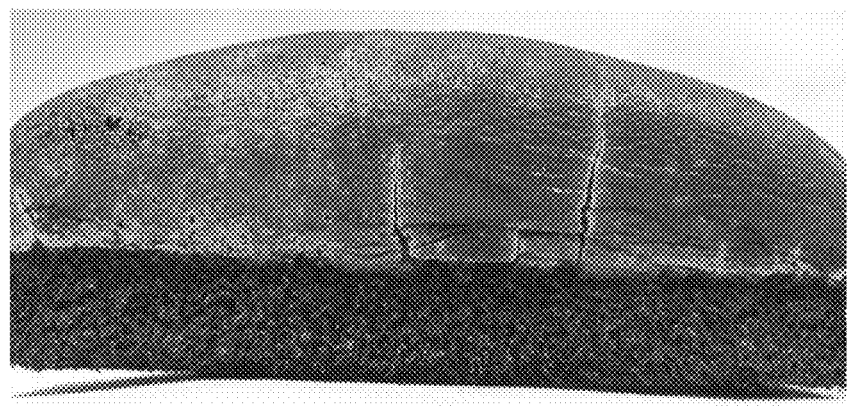
FIG. 1 is a schematic diagram of the bio-oil light fraction-based bread-shaped porous activated carbon material prepared in Example 1 of the present application.

The following detailed description of the embodiments is exemplary in order to further explain the present application. Generally, all technical and scientific terms used herein have the same meanings as those commonly understood by ordinary people in the technical field to which this application belongs.

It should be noted that the terminology used in the following detailed description is only for describing the detailed description, and is not intended to limit the exemplary embodiments according to the present application. In the following detailed description, unless the context clearly indicates otherwise, the singular form and the plural form were the same. It should be noted that "comprising" used in this specification indicates the presence of features, steps, operations, components, devices and/or combinations thereof.

The key idea of the present application lies in the present application of a method for preparing a bio-oil light fraction-based bread-shaped porous activated carbon. A small amount of an activator is directly mixed with a light fraction of bio-oil molecular distillation to obtain a uniform liquid mixture. The bread-shaped porous activated carbon with the characteristics of a uniform pore distribution, a large specific surface area and no ash is obtained by one-step activation method in two temperature stages, which reduces the usage amount of the activator, reduces the corrosion to the equipment and further improves the electrochemical performance of electrode materials of supercapacitors.

As described in the technical background, the existing chemical activation methods for preparing activated carbon mainly adopt one-step activation or two-step activation, and at the same time, the activator is mixed with a carbon precursor in a large mass ratio (activator: biomass or activator: pre-carbide). Commonly used mixing methods include grinding mixing, ultrasonic mixing, etc., which leads to the fact that the activator and the activation precursor can not be uniformly mixed, resulting in poor uniformity of the mixture. Secondly, a large number of activators need to be used, thus increasing the cost and causing environmental pollution, and the pore distribution of the obtained activated carbon is uneven. Because of the different kinds of biomass, it is difficult to unify the preparation process. in order to solve the above shortcomings, the present application provides a bio-oil light fraction-based bread-shaped porous activated carbon as well as a method for preparing the same and use thereof.

The systematic research and verification of the present application shows that the liquid bio-oil light fraction is mixed with a very small amount of an activator, and a uniform liquid mixture can be obtained after a certain period of magnetic stirring. This process can obviously reduce the amount of activator used and the corrosion to the equipment. Moreover, after one-step carbonization and activation at two temperature stages, the activated carbon with large specific surface area and uniform pore distribution can be obtained, and the pore size is mainly concentrated in the micropore size range, which provides a lot of space for the attachment of electrolyte ions. At the same time, the ash-free feature of activated carbon product can further improve the electrochemical performance of supercapacitors.

The present application provides a method for preparing a bio-oil light fraction-based bread-shaped porous activated carbon, which includes the following steps:

Step 1, preparation of raw materials: lignocellulosic biomass such as husk, sawdust, straw, bamboo, etc. is selected for rapid pyrolysis, with a final pyrolysis temperature of 350-800° C. and a heating rate≥100° C./min., to obtain biomass fast pyrolyzed bio-oil; further, the pyrolyzed bio-oil is subjected to molecular distillation, the molecular distillation pressure is usually in the range of 10-3000 Pa, the molecular distillation temperature is from normal temperature to 200° C., and the working pressure of the short-range distiller is 0.001-1 mbar, so as to obtain different kinds of bio-oil fractions, and the light fraction is used as the precursor for the preparation of activated carbon.

Step 2, preparation of an activator: a solid water-soluble active metal alkali such as potassium hydroxide and sodium hydroxide is selected; a solid water-soluble active metal salt such as potassium carbonate, sodium carbonate, potassium bicarbonate and sodium bicarbonate is prepared according to the mass ratio (activator: light fraction=1:22-3).

Step 3, mixing raw materials and activators: the activators in step 2 is added into the light fraction in step 1, the container is quickly sealed, the mixture is stirred with a magnetic stirrer for 0.5-2 hours, the water-soluble activator is fully dissolved in the water of the light fraction, and uniformly mixed to obtain a uniform liquid mixture.

Step 4, first-stage activation: the liquid mixture in step 3 is put in a nickel boat with an appropriate size in a horizontal tube furnace, and inert gases such as nitrogen, argon and helium are introduced into the tube furnace at a gas flow rate of 100-300 mL/min, a heating rate of 2-10° C./min, and a final heating temperature of 300-500° C. for 0.5-3 hours.

Step 5, second-stage activation: when the heating in step 4 is finished, the container is continually heated to a final temperature of 700-900° C. at a heating rate of 2-10° C./miry for 1-3 hours, and then cooled to room temperature to obtain the bread-shaped porous activated carbon.

Step 6, grinding and washing: after fully grinding the obtained bread-shaped porous activated carbon with a ball mill, it is sieved with a sieve of 100-200 meshes, the sieved powder is washed with a 0.5-2 M hydrochloric acid solution, magnetically stirred for 3-6 hours, repeatedly washed and filtered with suction with deionized water until the filtrate is neutral, so as to remove impurities such as reactant of activator in the activated carbon.

Step 7, drying and grinding: the product obtained in step 6 is dried in a ventilated drying oven for 10-12 hours, ground with a ball mill, and sieved with a 200-300 mesh sieve, finally obtaining the activated carbon which can be used as the energy storage active material of the electrode of the super capacitor. The light fraction used in the present application is brown-black, and the light fraction: 1) contains 15-50% water; 2) contains small molecular compounds including acids (20-30%), ketones (5-15%), aldehydes (5-10%) and monophenols (10-20%); 3) does not contain macromolecular compounds with a long carbon chain and a large molecular weight, such as pyrolytic lignin, aromatic polymer, anthracene, phenolic polymer and sugar; 4) does not contain ash.

Preferably, the light fraction of molecular distillation of bio-oil comes from walnut shell, poplar sawdust, corn straw and rice husk.

Preferably, the water content of the bio-oil molecular distillation light fraction is 20%-40%. Preferably, the light fraction of bio-oil molecular distillation contains small molecular compounds such as acids (20-25%), ketones (8-10%), aldehydes (5-8%) and monophenols (12-15%), which is more conducive to the preparation of a bio-oil molecular distillation light fraction-based bread-shaped porous activated carbon.

Preferably, the activator is potassium hydroxide or potassium bicarbonate. Preferably, the mass ratio of the bio-oil molecular distillation light fraction to the activator is 9-11:1. Preferably, the inert gas is nitrogen. Preferably, the specific steps of two-stage heating activation were as follows: the first temperature stage is 400° C., the heat holding time is 2 h, and the heating rate is 2° C./min; the second temperature stage is 800° C., the heat holding time is 2-3 h, and the heating rate is 2° C./min.

Salts, such as sodium salt and potassium salt, in the washing liquid generated in the preparation process of the present application can be recycled.

In a typical embodiment of the present application, the bio-oil molecular distillation light fraction-based bread-shaped porous activated carbon prepared by the above method steps is provided.

In a typical embodiment of the present application, use of the bio-oil light fraction-based bread-shaped porous activated carbon in supercapacitors is provided.

In a typical embodiment of the present application, an electrode material of a super capacitor is provided, which is prepared by using the bio-oil light fraction-based bread-shaped porous activated carbon.

In the embodiment of the present application, the bio-oil light fraction-based bread-shaped porous activated carbon has a three-dimensional porous structure, with a specific surface area of 1000-3000 $m^2/g$, a pore volume of 0.5-1.5 $cm^3/g$ and an average pore diameter of 1.8-2.6 nm. In the three-electrode test system, the mass-specific capacitance of the material with 6 M KOH and 1 M $H_2SO_4$ as an aqueous electrolyte is 80-770 F/g, and that of the material with 6 M KOH as an electrolyte in a button two-electrode supercapacitor of CR2025 is 80-240 F/g. In the three-electrode 6 M KOH aqueous electrolyte system, the mass-specific capacitance decays slowly with the increase of current intensity. The specific capacitance at 1 A/g, is 192 F/g, and the specific capacitance at 100 A/g is 148 F/g. After the current density increases 100 times, the specific capacitance attenuation of electrode materials is less than 25%.

The present application provides a bio-oil light fraction-based bread-shaped porous activated carbon for molecular distillation. Its specific surface area, pore size distribution, pore volume and average pore size can be adjusted and controlled by changing the proportion of the activator, the activation temperature and the activation time, and it is used as an electrode active material of supercapacitors.

In the embodiment of the present application, the representation and performance test method of a bio-oil light fraction-based bread-shaped porous activated carbon electrode material for supercapacitors is as follows:

Representation test 1: Measurements of the specific surface area, the pore volume, the pore size distribution, the specific surface area distribution and average pore size: the adsorption-desorption isotherm of nitrogen by the activated carbon in liquid nitrogen was measured, and the specific surface area and average pore size were obtained according to a BET model; the pore volume was obtained according to the total pore volume of the single-point adsorption pore; the pore size distribution and specific surface area distribution were obtained according to a DFT model.

Representation test 2: SEM representation test: by a SU8010 cold field emission scanning electron microscope made by HITACHI, Japan, obtained by treatment after gold spraying.

Representation test 3: X-ray photoelectron spectroscopy test: by an ESCALAB X-ray photoelectron spectrometer of VG Company in UK, with a range of 0-1100 eV.

Representation test 4: Raman spectrum test: by a 532 nm laser confocal Raman spectrometer of LabRAM HR Evolution of French Horiba Jobin Yvon Company, with a range of 400-2450 $cm^{-1}$.

Representation test 5: Specific capacitance test: by a CHI1660E electrochemical workstation of China Chenhua Company.

Example 1

The present application relates to a method for preparing a bio-oil light fraction-based bread-shaped porous activated carbon, which includes the following steps:

Step 1, preparation of raw materials: walnut shells were selected as biomass raw materials, and bio-oil was obtained after rapid pyrolysis at 550° C.; under the molecular distillation conditions of 1500 Pa/60° C. and a short-range distiller working pressure of 0.1 mbar, the bio-oil molecules were distilled into a light fraction, which was used as a raw material for a carbon precursor.

Step 2, preparation of an activator: $K_2CO_3$ was selected as an activator, and the activator was prepared according to the mass ratio (activator: light fraction=1:9).

Step 3, mixing raw materials and the activator: the activators in step 2 was slowly added into the light fraction in step 1, the container was sealed, and the mixture was stirred for 1 hour with a magnetic stirrer to fully mix the activator with the light fraction to obtain a liquid homogeneous mixture.

Step 4, first-stage activation: the liquid mixture in step 3 was put in a nickel boat, and the nickel boat was placed in a horizontal tube furnace, which was filled with inert gases such as nitrogen and argon, with a gas flow rate of 300 mL/min, a heating rate of 2° C./min, a final heating temperature of 400° C. and a heat holding time of 3 hours.

Step 5, second-stage activation: after the heating stage in step 4, the furnace was continually heated to 800° C. at a heating rate of 2° C/min for 3 hours, and then cooled to room temperature to obtain a bread-shaped porous activated carbon.

Step 6, grinding and washing: the obtained activated carbon was fully ground with a ball mill, and after sieving with a 200-mesh sieve, the obtained powdery solid was washed with a 1 M hydrochloric acid solution, magnetically stirred for 6 hours, then repeatedly washed and filtered with suction with deionized water until the filtrate was neutral, and the remaining activator and generated inorganic salts in the activated carbon were removed.

Step 7, drying and grinding: the product obtained in step 6 was dried in a ventilated drying oven for 12 hours, and then ground with a ball mill and sieved with a 220-mesh sieve to finally obtain the activated carbon which can be used as the energy storage active material of supercapacitor electrodes.

Step 8, 0.08 g of the bio-oil light fraction-based bread-shaped porous activated carbon obtained in step 7 was taken, and the test material, conductive carbon black and a binder were added into the activated carbon in the ratio of 8:1:1, and then isopropanol was added, fully ground and rolled into a film. Then the film was dried at 110° C. for 12 hours in a ventilated drying oven, cut into square carbon films of 1 cm×1 cm, and the cut carbon film was pressed onto 1 cm×2 cm foam nickel (a current collector) under a pressure of 10 MPa.

Step 9, the carbon film cut out in step 8 was pressed on 1 cm×2 cm conductive carbon paper (a current collector).

Step 10, the carbon film prepared in step 8 was cut into a circular carbon film with a diameter of 1.5 cm, the carbon film was pressed on foamed nickel of the same size, two electrode pieces with a similar mass were selected as symmetrical electrodes (two-electrode system), and were separated with a PTFE separator, and assembled in a button capacitor of CR2025, wherein 6 M KOH as was used as an electrolyte.

Figure 2:
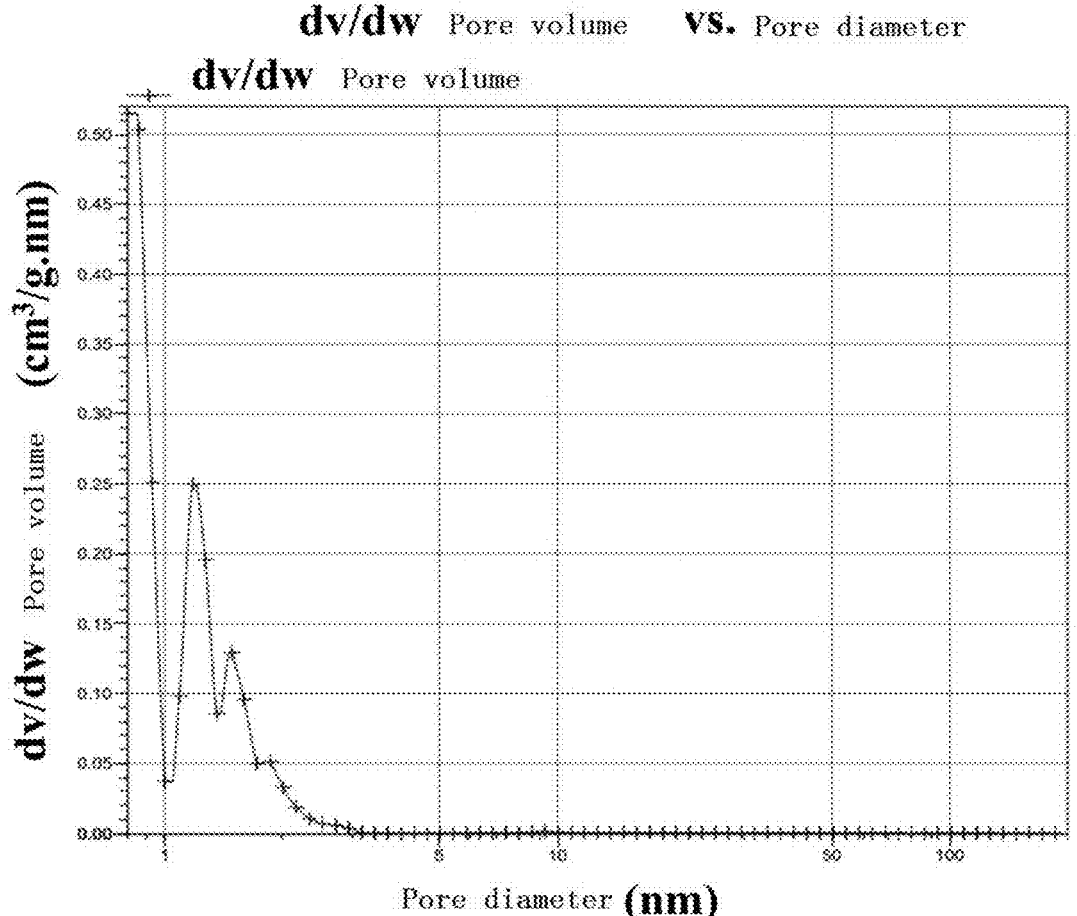
FIG. 2 is the pore size distribution diagram of the bio-oil light fraction-based bread-shaped porous activated carbon material prepared in Example 1 of the present application.
Figure 3:
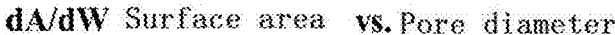
FIG. 3 is a specific surface area distribution diagram of the bio-oil light fraction-based bread-shaped porous activated carbon material prepared in Example 1 of the present application.
Figure 3:
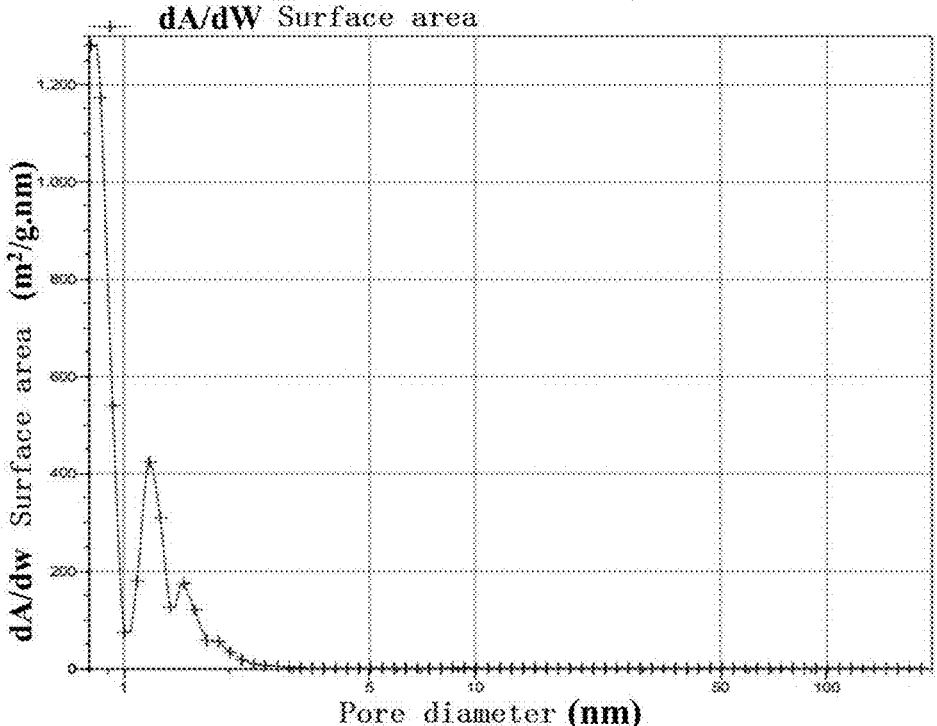
Figure 4:
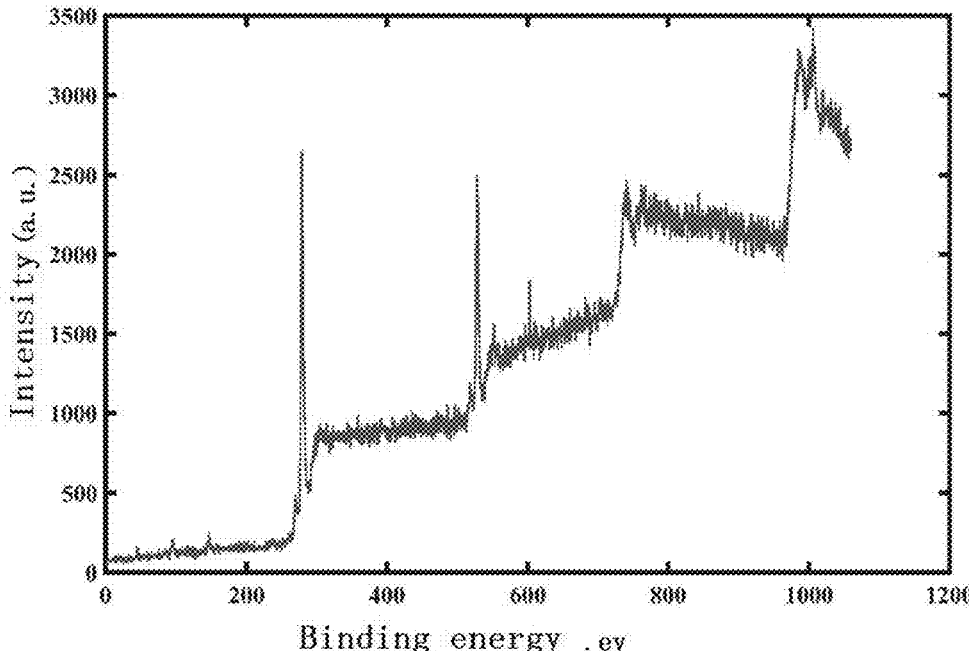
FIG. 4 is an X-ray photoelectron spectrum of the bio-oil light fraction-based bread-shaped porous activated carbon material prepared in Example 1 of the present application.

Implementation effect 1: the bio-oil light fraction-based bread-shaped porous activated carbon in Example 1 has a specific surface area of 1326 $m^2/g$, a pore volume of 0.623 $m^3/g$, and an the average pore diameter of 1.88 nm; the pore diameter distribution was shown in FIG. 2, the specific surface area distribution was shown in FIG. 3, the X-ray photoelectron spectroscopy test spectrum was shown in FIG. 4, and the Raman spectroscopy test spectrum was shown in FIG, 5.

Figure 6:
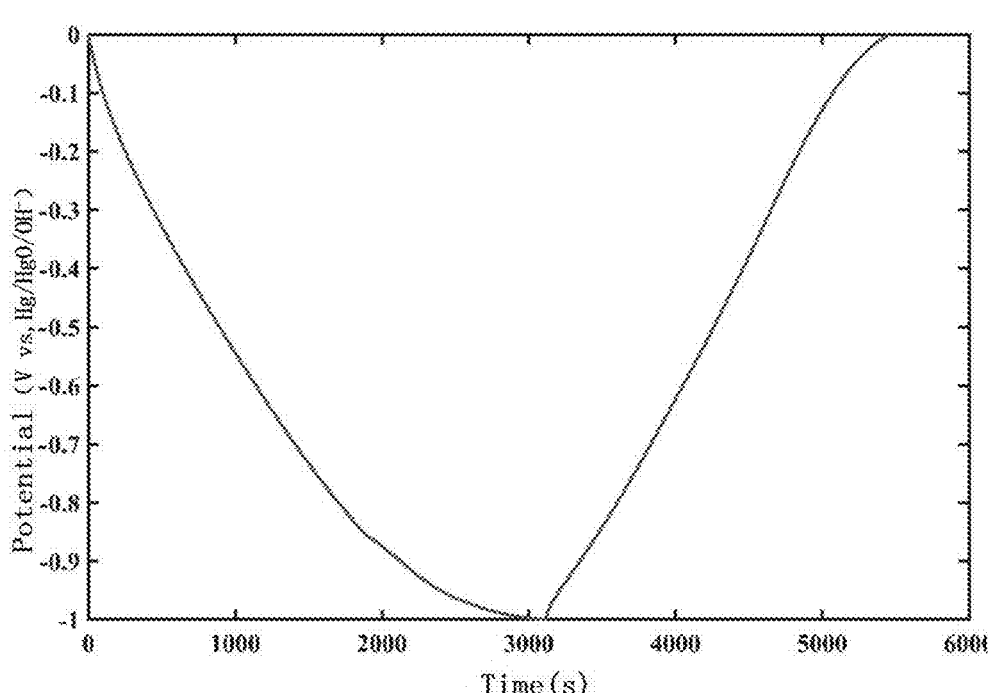
FIG. 6 is a constant-current charge-discharge test diagram of the bio-oil light fraction-based bread-shaped porous activated carbon material prepared in Example 1 of the present application under the action of a current intensity of 0.1 A/g in a three-electrode system.
Figures 7, 8:
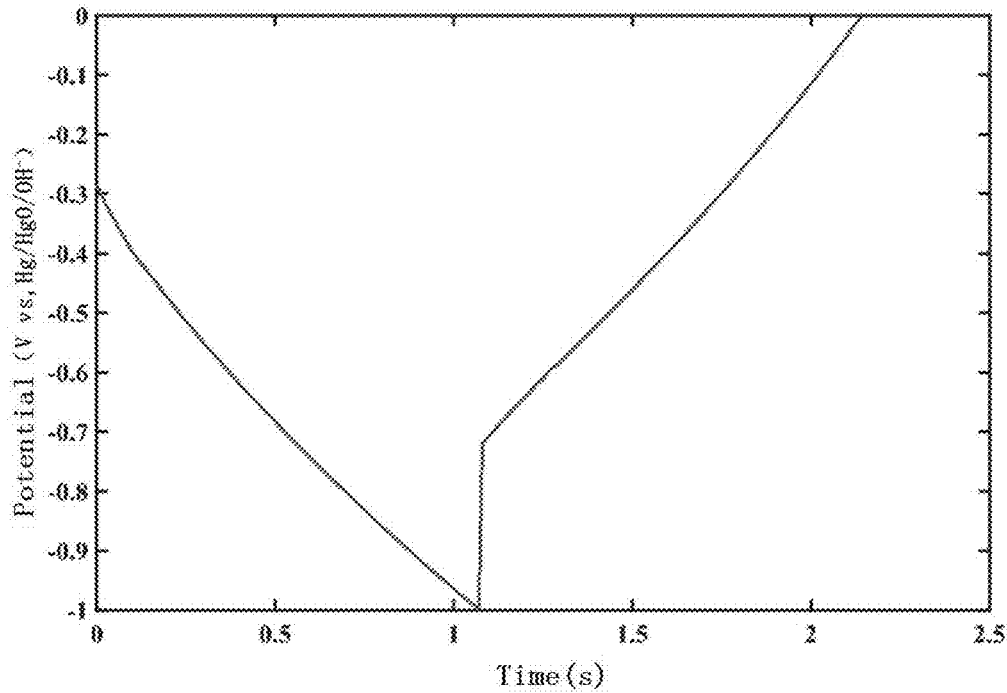
FIG. 7 is a constant-current charge-discharge test diagram of the bio-oil light fraction-based bread-shaped porous activated carbon material prepared in Example 1 of the present application under the action of a current intensity of 100 A/g in a three-electrode system.
FIG. 8 is a rate performance diagram of the bio-oil light fraction-based bread-shaped porous activated carbon material prepared in Example 1 of the present application.
Figure 9:
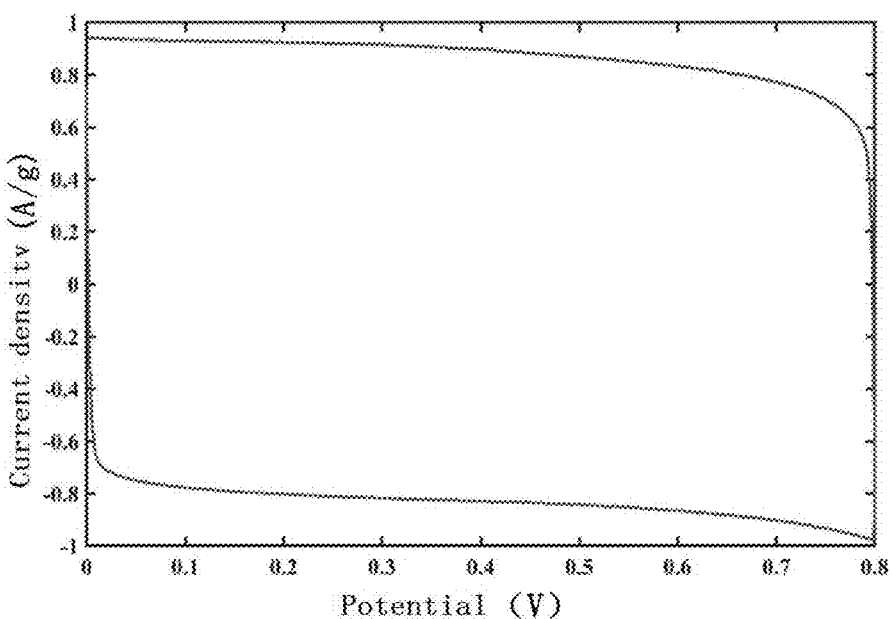
FIG. 9 is a cyclic voltammetric test diagram of the bio-oil light fraction-based bread-shaped porous activated carbon material prepared in Example 1 of the present application in the CR2025 button two-electrode system at a scanning rate of 0.01 V/s.

Implementation effect 2: the electrode with rectangular foam nickel as a current collector was used in a 6 M KOH electrolyte to assemble a three-electrode system in, and the specific capacitance was 234 F/g at a current density of 0.1 A/g, as shown in FIG. 6; the specific capacitance was 192 F/g at a current density of 1/g; the specific capacitance was 148 F/g at a current density of 100 A/g, as shown in FIG. 7; the specific capacitances at different current densities were shown in FIG. 8; the electrodes made of conductive carbon paper as current collectors were used in 1 M $H_2SO_4$ electrolyte to form a three-electrode system; the specific capacitance was 769 F/g at 0.1 A/g current density, 462 F/g at t a current density of 1 A/g and 146 F/g at t a current density of 100 A/g; in the two-electrode system, the specific capacitance was 175 F/g at a current density of 0.1 A/g, 157 F/g at a current density of 1 A/g and 151 F/g at a current density of 80 A/g; the cyclic voltammetric curve of 0.1 V/s was shown in FIG. 9.

Example 2

The present application relates to a method for preparing a bio-oil light fraction-based bread-shaped porous activated carbon, which includes the following steps:

Step 1, preparation of raw materials: walnut shells were selected as biomass raw materials, and bio-oil was obtained after rapid pyrolysis at 550° C.; under the molecular distillation conditions of 1500 Pa/60° C. and a short-range distiller working pressure of 0.1 mbar, the bio-oil molecules were distilled into a light fraction, which was used as a raw material for a carbon precursor.

Step 2, preparation of an activator: $K_2CO_3$ was selected as an activator, and the activator was prepared according to the mass ratio (activator: light fraction=1:9).

Step 3, the same as step 3 of Example 1; Step 4, the same as step 4 of Example 1; Step 5, the same as step 5 of Example 1, except that the final heating temperature was changed to 700° C.; Steps 6-10 were the same as those of Example 1.

Figure 5:
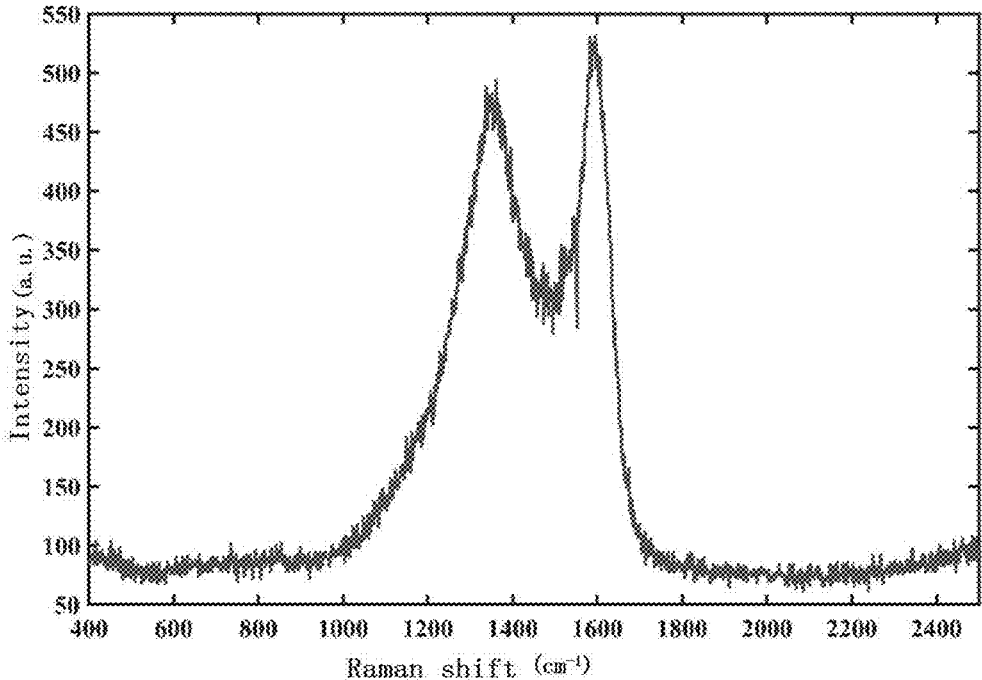
FIG. 5 is the Raman spectrum of the bio-oil light fraction-based bread-shaped porous activated carbon material prepared in Example 1 of the present application.

Implementation effect 1: the bio-oil light fraction-based bread-shaped porous activated carbon in Example 2 has a specific surface area of 1,730 $m^2/g$, a pore volume of 0.830 $m^3/g$, and an average pore diameter of 1.92 nm; the pore diameter distribution was shown in FIG. 2, the specific surface area distribution was shown in FIG. 3, the X-ray photoelectron spectroscopy test spectrum was shown in FIG. 4, and the Raman spectroscopy test spectrum was shown in FIG. 5.

Implementation effect 2: the electrode with rectangular foam nickel as a current collector was used in 6 M KOH electrolyte to assemble a three-electrode system; the specific capacitance was 193 F/g at t a current density of 0.1 A/g, 170 F/g at t a current density of 1 A/g and 122 F/g at a current density of 100 A/g; electrodes made of conductive carbon paper as current collectors were used in 1 M $H_2SO_4$ electrolyte to form a three-electrode system; the specific capacitance was 560 F/g at t a current density of 0.1 A/g, 335 F/g at t a current density of 1 A/g and 110 F/g at a current density of 100 A/g; in the two-electrode system, the specific capacitance was 171 F/g at a current density of 0.1 A/g, 160 F/g at a current density of 1 A/g and 152 F/g at a current density of 50 A/g.

Example 3

The present application relates to a method for preparing a bio-oil light fraction-based bread-shaped porous activated carbon, which includes the following steps:

Step 1, preparation of raw materials: walnut shells were selected as biomass raw materials, and bio-oil was obtained after rapid pyrolysis at 550° C.; under the molecular distillation conditions of 1500 Pa/60° C. and a short-range distiller working pressure of 0.1 mbar, the bio-oil molecules were distilled into a light fraction, which was used as a raw material for a carbon precursor.

Step 2, preparation of an activator: $K_2CO_3$ was selected as an activator, and the activator was prepared according to the mass ratio (activator: light fraction=1:11).

Step 3, the same as step 3 of Example 1; Step 4, the same as step 4 of Example 1, except that the heating rate was changed to 5° C./min and the temperature was kept for 2 hours; Step 5, the same as step 5 of Example 1, except that the heating rate was changed to 5° C./min, the final heating temperature to 900° C. and the heat holding time to 2 hours; Step 6, the same as step 6 of Example 1; Step 7, the same as step 7 of Example 1, in which a sieve with a mesh size of 300 mesh was selected; Step 8, the same as step 8 of Example 1.

Implementation effect 1: the bio-oil light fraction-based bread-shaped porous activated carbon in Example 3 has a specific surface area of 1830 $m^2$/g, a pore volume of 1.12 $m^3$/g, and an average pore diameter of 2.45 nm.

Implementation effect 2: the electrode with rectangular foam nickel as a current collector was used in a 6 M KOH electrolyte to assemble a three-electrode system; the specific capacitance was 160 F/g at a current density of 0.1 A/g, 154 F/g at a current density of 1 A/g, 129 F/g at a current density of 50 A/g and 124 F/g at a current density of 100 A/g.

Example 4

The present application relates to a method for preparing a bio-oil light fraction-based bread-shaped porous activated carbon, which includes the following steps:

Step 1, preparation of raw materials: rice hulls were selected as biomass raw materials, and bio-oil was obtained after rapid pyrolysis at 550° C.; under the molecular distillation conditions of 1800 Pa/60° C. and a short-range distiller working pressure of 0.1 mbar, the bio-oil molecules were distilled into a light fraction, which was used as a raw material for a carbon precursor.

Step 2, preparation of an activator: $K_2CO_3$ was selected as an activator, and the activator was prepared according to the mass ratio (activator: light fraction=1:10).

Step 3, the same as step 3 of Example 1; Step 4: the same as step 4 of Example 3, except that the heating rate was changed to 10° C./min and the final heating temperature to 300° C.; Step 5, the same as step 5 of Example 3, except that the heating rate was changed to 10°

C./min, the final heating temperature to 800° C. and the heat holding time to 2 hours; Steps 6 to 9 were the same as those of Example 1.

Figure 10:
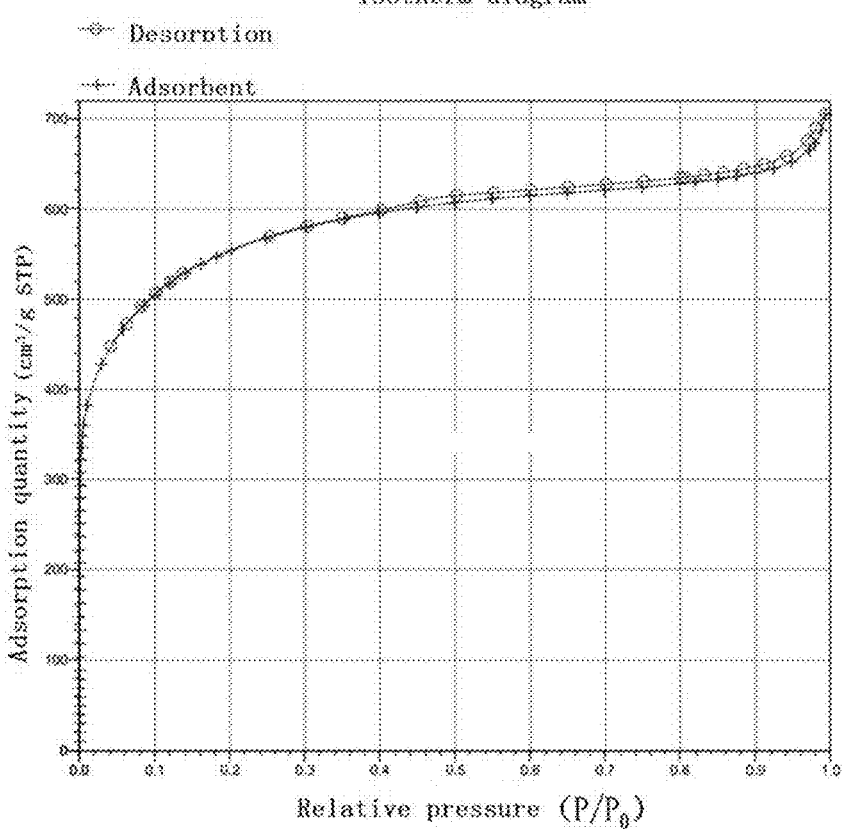
FIG. 10 is a nitrogen adsorption-desorption isotherm diagram of the bio-oil light fraction-based bread-shaped porous activated carbon material prepared in Example 2 of the present application.
Figure 11:
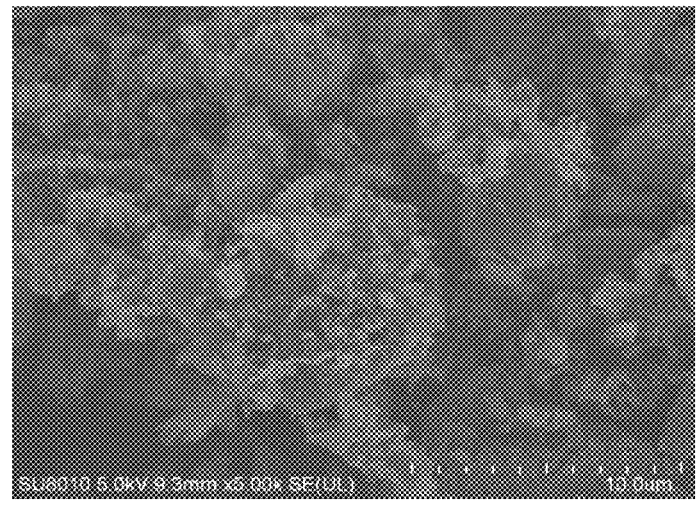
FIG. 11 is a field emission scanning electron microscope photograph of the bio-oil light fraction-based bread-shaped porous activated carbon material prepared in Example 2 of the present application.
Figure 12:
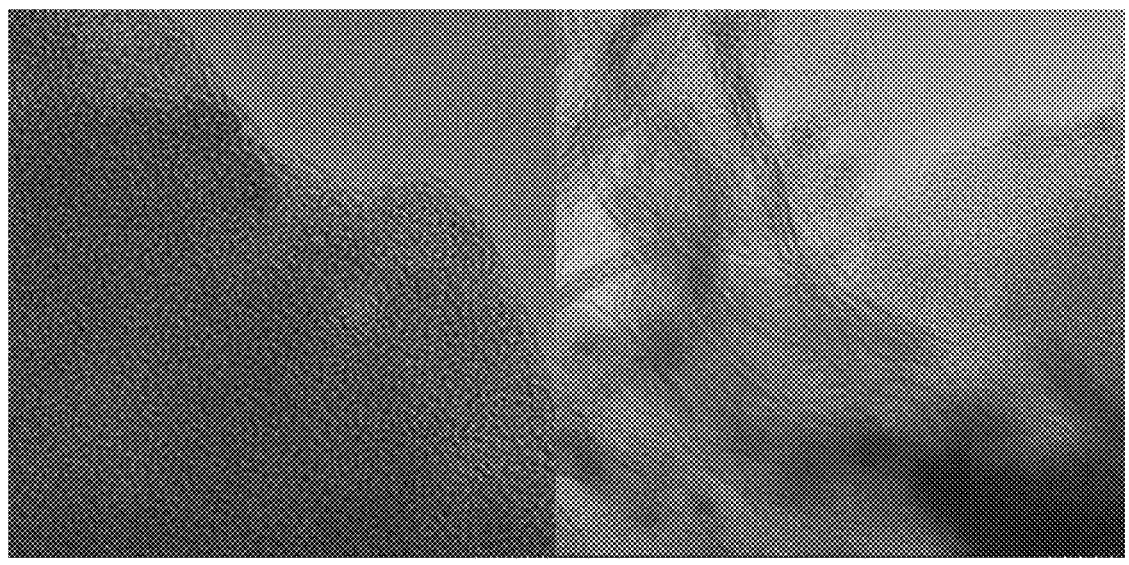
FIG. 12 is a transmission electron microscope photograph of the bio-oil light fraction-based bread-shaped porous activated carbon material prepared in Example 2 of the present application.
Figure 13:
FIG. 13 shows the specific capacitance retention rate of the bio-oil light fraction-based bread-shaped porous activated carbon material prepared in Example 2 of the present application after 50,000 cycles at a current density of 15 A/g.

Implementation effect 1: the bio-oil light fraction-based bread-shaped porous activated carbon in Example 4 has a specific surface area of 2044 $m^2$/g, a pore volume of 1.088 $m^3$/g, and an average pore diameter of 2.13 nm, and the nitrogen adsorption-desorption curve was shown in FIG. 10, and the scanning electron microscope photos were shown in FIG. 11.

Implementation effect 2: the electrode with rectangular foam nickel as a current collector was used in 6 M KOH electrolyte to assemble a three-electrode system, with a specific capacitance of 191 F/g at a current density of 0.1 A/g, 173 F/g at a current density of 1 A/g and 134 F/g at a current density of 50 A/g; electrodes made of conductive carbon paper as current collectors were used in a 1 M $H_2SO_4$ electrolyte to form a three-electrode system; the specific capacitance was 644 F/g at a current density of 0.1 A/g, 394 F/g at a current density of 1 A/g and 118 F/g at current density of 100 A/g.

Example 5

The present application relates to a method for preparing a bio-oil light fraction-based bread-shaped porous activated carbon, which includes the following steps:

Step 1, preparation of raw materials: corn stalks were selected as biomass raw materials, and bio-oil was obtained after rapid pyrolysis at 550° C.; under the molecular distillation conditions of 1500 Pa/50° C. and a short-range distiller working pressure of 0.1 mbar, the bio-oil molecules were distilled into a light fraction, which was used as a raw material for a carbon precursor.

Step 2, preparation of an activator: $K_2CO_3$ was selected as an activator, and the activator was prepared according to the mass ratio (activator: light fraction=1:15).

Step 3, the same as step 3 of Example 1; Step 4, the same as step 4 of Example 4, except that the final heating temperature was changed to 500° C. and the temperature was kept for 3 hours; Step 5, the same as step 5 of Example 4, except that the final heating temperature was changed to 900° C. and the temperature was kept for 3 hours; Steps 6-10 were the same as those of Example 1.

Implementation effect 1: the bio-oil light fraction-based bread-shaped porous activated carbon in Example 5 had a specific surface area of 1761 $m^2$/g, a pore volume of 0.850 $m^3$/g, and an average pore diameter of 1.93 nm.

Implementation effect 2: the electrode with rectangular foam nickel as a current collector was used in a 6 M KOH electrolyte to assemble a three-electrode system, with a specific capacitance of 190 F/g at a current density of 0.1 A/g, 167 F/g at a current density of 1 A/g and 118 F/g at a current density of 50 A/g; electrodes made of conductive carbon paper as current collectors were used in 1 a M $H_2SO_4$ electrolyte to form a three-electrode system; the specific capacitance was 552 F/g at a current density of 0.1 A/g, 327 F/g at a current density of 1 A/g and 109 F/g at a current density of 100 A/g; in the two-electrode system, the specific capacitance was 168 F/g at a current density of 0.1 A/g, 157 F/g at a current density of 1 A/g and 140 F/g at a current density of 50 A/g.

Example 6

The present application relates to a method for preparing a bio-oil light fraction-based bread-shaped porous activated carbon, which includes the following steps:

Step 1, preparation of raw materials: scraps of willow were selected as biomass raw materials, and bio-oil was obtained after rapid pyrolysis at 450° C.; under the molecular distillation conditions of 1700 Pa/70° C. and a short-range distiller working pressure of 0.1 mbar, the bio-oil molecules were distilled into a light fraction, which was used as a raw material for a carbon precursor.

Step 2, preparation of an activator: $KHCO_3$ was selected as an activator, and the activator was prepared according to the mass ratio (activator: light fraction=1:3).

Step 3, the same as step 3 of Example 1; Step 4, the same as step 4 of Example 3, except that the heat holding time was 0.5 hours; Step 5, the same as step 5 of Example 3, except that the final heating temperature was changed to 800° C. and the temperature was kept for 3 hours; Steps 6-10 were the same as those of Example 1.

Implementation effect 1: bio-oil light fraction-based bread-shaped porous activated carbon in Example 6 has a specific surface area of 1950 $m^2/g$, a pore volume of 1.126 $m^3/g$ and an average pore diameter of 2.31 nm.

Implementation effect 2: the electrode with rectangular foam nickel as a current collector was used in a 6 M KOH electrolyte to assemble a three-electrode system, with a specific capacitance of 210 F/g at a current density of 0.1 A/g, 190 F/g at current density of 1 A/g and 163 F/g at a current density of 50 A/g; electrodes made of conductive carbon paper as current collectors were used in a 1 M $H_2SO_4$ electrolyte to form a three-electrode system; the specific capacitance was 530 F/g at a current density of 0.1 A/g, 360 F/g at a current density of 1 A/g and 134 F/g at a current density of 100 A/g; in the two-electrode system, the specific capacitance was 172 F/g at a current density of 0.1 A/g, 160 F/g at a current density of 1 A/g and 145 F/g at a current density of 50 A/g.

Example 7

The present application relates to a method for preparing a bio-oil light fraction-based bread-shaped porous activated carbon, which includes the following steps:

Step 1, preparation of raw materials: scraps of willow were selected as biomass raw materials, and bio-oil was obtained after rapid pyrolysis at 450° C.; under the molecular distillation conditions of 3000 Pa/70° C. and a short-range distiller working pressure of 0.1 mbar, the bio-oil molecules were distilled into a light fraction, which was used as a raw material for a carbon precursor.

Step 2, preparation of an activator: KOH was selected as an activator, and the activator was prepared according to the mass ratio (activator: light fraction=1:22).

Step 3, the same as step 3 of Example 1; Step 4, the same as step 4 of Example 1, except that the heat holding time was changed to 1 hour; Step 5, the same as step 5 of Example 1, except that the heat holding time was changed to 2 hours; Steps 6-8 were the same as those of Example 1.

Implementation effect 1: the bio-oil light fraction-based bread-shaped porous activated carbon in Example 7 had a specific surface area of 1736 $m^2/g$, a pore volume of 1.085 $m^3/g$, and an average pore diameter of 2.50 nm.

Implementation effect 2: the electrode with rectangular foam nickel as a current collector was used in a 6 M KOH electrolyte to assemble a three-electrode system; the specific capacitance was 191 F/g at a current density of 0.1 A/g, 164 F/g at a current density of 1 A/g and 117 F/g at a current density of 50 A/g.

Example 8

The present application relates to a method for preparing a bio-oil light fraction-based bread-shaped porous activated carbon, which includes the following steps:

Step 1, preparation of raw materials: bamboo was selected as a biomass raw material, and bio-oil was obtained after rapid pyrolysis at 500° C.; under the molecular distillation conditions of 1700 Pa/60° C. and a short-range distiller working pressure of 0.1 mbar, the bio-oil molecules were distilled into a light, fraction, which was used as a raw material for a carbon precursor.

Step 2, preparation of activator: NaOH was selected as an activator, and the activator was prepared according to the mass ratio (activator: light fraction=1:3).

Step 3, the same as step 3 of Example 1; Step 4, the same as step 4 of Example 1, except that the final heating temperature was 500° C. and the heat holding time was 2 hours; Step 5, the same as step 5 of Example 1, except that the final heating temperature was changed to 900° C.; Step 6, the same as step 6 of Example 1; Step 7, the same as step 7 of Example 1, in which a sieve with a mesh size of 400 mesh was selected; Step 8, the same as step 8 of Example 1.

Implementation effect 1: bio-oil light fraction-based bread-shaped porous activated carbon in Example 8 had a specific surface area of 1240 $m^2/g$, a pore volume of 0.769 $m^3/g$, and an average pore diameter of 2.48 nm.

Implementation effect 2: the electrode with rectangular foam nickel as a current collector was used in a 6 M KOH electrolyte to assemble a three-electrode system; the specific capacitance was 156 F/g at a current density of 0.1 A/g, 124 F/g at a current density of 1 A/g and 101 F/g at a current density of 50 A/g.

Example 9

The present application relates to a method for preparing a bio-oil light fraction-based bread-shaped porous activated carbon, which includes the following steps:

Step 1, preparation of raw materials: bamboo was selected as a biomass raw material, and bio-oil was obtained after rapid pyrolysis at 450° C.; under the molecular distillation conditions of 1500 Pa/60° C. and short-range distiller working pressure of 0.1 mbar, the bio-oil molecules were distilled into a light fraction, which was used as a raw material for a carbon precursor.

Step 2, preparation of activator: $K_2CO_3$ was selected as activator, and activator was prepared according to the mass ratio (activator: light fraction=1:3).

Step 3, the same as step 3 of Example 1; Step 4, the same as step 4 of Example 8; Step 5, the same as step 5 of Example 8, except that the final heating temperature was changed to 800° C. and the temperature was kept for 2 hours; Step 6: the same as step 6 of Example 1; Step 7: the same as step 7 of Example 1, in which a sieve with a mesh size of 500 mesh was selected; Step 8, the same as step 8 of Example 1.

Implementation effect 1: the bio-oil light fraction-based bread-shaped porous activated carbon in Example 9 had a specific surface area of 2030 $m^2/g$, a pore volume of 1.03 $m^3/g$ and an average pore diameter of 2.03 nm.

Implementation effect 2: the electrode with rectangular foam nickel as a current collector was used in a 6 M KOH electrolyte to assemble a three-electrode system; the specific capacitance was 215 F/g at a current density of 0.1 A/g, 194 F/g at a current density of 1 A/g and 145 F/g at a current density of 50 F/g.

Example 10

The present application relates to a method for preparing a bio-oil light fraction-based bread-shaped porous activated carbon, which includes the following steps:

Step 1, preparation of raw materials: bamboo was selected as a biomass raw material, and bio-oil was obtained after rapid pyrolysis at 450° C.; under the molecular distillation conditions of 1500 Pa/60° C. and short-range distiller working pressure of 0.01 mbar, the bio-oil molecules were distilled into a light fraction, which was used as a raw material for a carbon precursor.

Step 2, preparation of an activator: KOH was selected as an activator, and the activator was prepared according to the mass ratio (activator: light fraction=1:3.7).

Step 3, the same as step 3 of Example 1; Step 4, the same as step 4 of Example 2, except that the heating rate was 5° C./min and the heat holding time was 2 hours; Step 5, the same as step 5 of Example 2, except that the heating rate was 5° C/min and the final heating temperature was 800° C.; Steps 6-8 were the same as those of Example 1.

Implementation effect 1: the bio-oil light fraction-based bread-shaped porous activated carbon in Example 10 had a specific surface area of 2103 $m^2/g$, a pore volume of 1.19 $m^3/g$, and an average pore diameter of 2.27 nm.

Implementation effect 2: the electrode with rectangular foam nickel as a current collector was used in a 6 M KOH electrolyte to assemble a three-electrode system; the specific capacitance was 212 F/g at a current density of 0.1 A/g, 193 F/g at a current density of 1 A/g and 144 F/g at a current density of 50 A/g.

Example 11

The present application relates to a method for preparing a bio-oil light fraction-based bread-shaped porous activated carbon, which includes the following steps:

Step 1, preparation of raw materials: bamboo was selected as a biomass raw material, and bio-oil was obtained after rapid pyrolysis at 450° C. under the molecular distillation conditions of 1500 Pa/60° C. and short-range distiller working pressure of 0.01 mbar, the bio-oil molecules were distilled into a light fraction, which was used as a raw material for a carbon precursor.

Step 2, preparation of an activator: KOH was selected as an activator, and the activator was prepared according to the mass ratio (activator: light fraction=1:3.7).

Step 3, the same as step 3 of Example 1; Step 4, the same as step 4 of Example 3, except that the heating rate was 8° C./min; Step 5, the same as step 5 in Example 3, except that the heating rate was 8° C./min; Steps 6-8 were the same as those of Example 1.

Implementation effect 1: the bio-oil light fraction-based bread-shaped porous activated carbon in Example 11 had a specific surface area of 1706 $m^2/g$, a pore volume of 0.943 $m^3/g$, and an average pore diameter of 2.21 nm.

Implementation effect 2: the electrode with rectangular foam nickel as a current collector was used in a 6 M KOH electrolyte to assemble a three-electrode system; the specific capacitance was 176 F/g at a current density of 0.1 A/g, 154 F/g at a current density of 1 A/g and 121 F/g at a current density of 50 A/g.

Example 12

The present application relates to a method for preparing a bio-oil light fraction-based bread-shaped porous activated carbon, which includes the following steps:

1. Preparation of raw materials: walnut shells were selected as a biomass raw material, and bio-oil was obtained after rapid pyrolysis at 550° C.; under the molecular distillation conditions of 1500 Pa/60° C. and short-range distiller working pressure of 0.1 mbar, the bio-oil molecules were distilled into a light fraction, which was used as a raw material for a carbon precursor.

Step 2, preparation of an activator: KOH was selected as an activator, and the activator was prepared according to the mass ratio (activator: light fraction=1:5.5).

Step 3, the same as step 3 of Example 1; Step 4, the same as step 4 of Example 1, except that the heat holding time was 2 hours; Step 5, the same as step 5 of Example 3, except that the heat holding time was 2 hours; Steps 6-8 were the same as those of Example 1.

Implementation effect 1: the bio-oil light fraction-based bread-shaped porous activated carbon in Example 12 had a specific surface area of 1905 $m^2/g$, a pore volume of 1.062 $m^3/g$, and an average pore diameter of 2.23 nm.

Implementation effect 2: the electrode with rectangular foam nickel as a current collector was used in a 6 M KOH electrolyte to assemble a three-electrode system; the specific capacitance was 183 F/g at a current density of 0.1 A/g, 168 F/g at a current density of 1 A/g and 129 F/g at a current density of 50 A/g.

Example 13

The present application relates to a method for preparing a bio-oil light fraction-based bread-shaped porous activated carbon, which includes the following steps:

1. Preparation of raw materials: walnut shells were selected as a biomass raw material, and bio-oil was obtained after rapid pyrolysis at 550° C.; under the molecular distillation conditions of 1500 Pa/60° C. and short-range distiller working pressure of 0.1 mbar, the bio-oil molecules were distilled into a light fraction, which was used as a raw material for a carbon precursor.

Step 2, preparation of an activator: KOH was selected as an activator, and activator was prepared according to the mass ratio (activator: light fraction=1:11).

Step 3, the same as step 3 of Example 1. Step 4: the same as step 4 of Example 1, except that the final heating temperature was 500° C.; Step 5: the same as step 5 of Example 3, except that the final heating temperature was 900° C.; Steps 6-8 were the same as those of Example 1.

Implementation effect 1: the bio-oil light fraction-based bread-shaped porous activated carbon in Example 13h had a specific surface area of 1874 m²/g, a pore volume of 0.900 m³/g, and an average pore diameter was 1.92 nm.

Implementation effect 2: the electrode with rectangular foam nickel as a current collector was used in a 6 M KOH electrolyte to assemble a three-electrode system; the specific capacitance was 169 F/g at a current density of 0.1 A/g, 141 F/g at a current density of 1 A/g and 107 F/g at a current density of 50 A/g.

Example 14

According to a method for preparing a bio-oil light fraction-based bread-shaped porous activated carbon, in this example, the heating method was different from that of Examples 1-13. This example adopts the one-step carbonization activation method of a single temperature stage to compare and illustrate that the bio-oil light fraction-based bread-shaped porous activated carbon prepared by the one-step carbonization activation method of two temperature stages has better physical and chemical characteristics.

The method includes the following steps:

Step 1, preparation of raw materials: walnut shells were selected as a biomass raw material, and bio-oil was obtained after rapid pyrolysis at 550° C.; under the molecular distillation conditions of 1500 Pa/60° C. and short-range distiller working pressure of 0.1 mbar, the bio-oil molecules were distilled into a light fraction, which was used as a raw material for a carbon precursor.

Step 2, preparation of an activator: KOH was selected as an activator, and the activator was prepared according to the mass ratio (activator: light fraction=1:11).

Step 3, the same as step 3 of Example 1.

Step 4, the liquid mixture in step 3 was put in a nickel boat into a horizontal tube furnace, and inert gases such as nitrogen and argon were introduced into the tube furnace at a gas flow rate of 300 mL/min, the temperature was directly increased to a final heating temperature of 800° C. with heating rate was 2° C./min, and a heat holding time of 2 hours, and then the mixture was naturally cooled to room temperature to obtain a solid product.

Step 5, the same as step 6 of Example 1; Step 6: the same as step 7 of Example 1, in which a sieve with a mesh size of 300 mesh was selected; Step 7, the same as step 8 of Example 1.

Implementation effect 1: the bio-oil light fraction-based bread-shaped porous activated carbon in Example 14 had a specific surface area of 1330 m²/g, a pore volume of 0.85 m³/g, and an average pore diameter of 2.56 nm.

Implementation effect 2: the electrode with rectangular foam nickel as a current collector was used in a 6 M KOH electrolyte to assemble a three-electrode system; the specific capacitance was 123 F/g at a current density of 0.1 F/g, 98 F/g at a current density of 1 A/g and 74 F/g at a current density of 50 A/g.

The above examples were the preferred embodiments of the present application, but the embodiments of the present application were not limited by the above examples. Any other changes, modifications, substitutions, combinations and simplifications that do not violate the spirit and principles of the present application should be equivalent replacement methods, which were included in the scope of protection of the present application.

What is claimed is:

1. A method for preparing a bio-oil light fraction-based porous activated carbon, comprising the following steps of:

carrying out molecular distillation on bio-oil obtained by pyrolysis of biomass to obtain a light fraction, wherein the light fraction is in a liquid phase;

using the light fraction as a carbon precursor raw material, and mixing an activator with the light fraction to form a mixed solution, wherein the activator is a solid water-soluble active metal alkali or salt; and subjecting the mixed solution to continuous thermal treatment in which carbonization and chemical activation of the carbon precursor occur concurrently to obtain the bio-oil light fraction-based porous activated carbon, wherein the bio-oil light fraction-based porous activated carbon has a three-dimensional porous internal structure with a density of 0.01-0.03 g/cm³.

2. The method according to claim 1, wherein the step of carbonization and chemical activation comprises multi-stage heating.

3. The method according to claim 2, specifically comprising the following steps:

S1, firstly, preparing bio-oil obtained by pyrolysis of biomass, carrying out molecular distillation on the bio-oil to obtain the light fraction, then mixing the activator with the light fraction according to a predetermined mass ratio and stirring for a predetermined time to obtain a mixed homogeneous liquid of the light fraction and the activator, subjecting the mixed homogeneous liquid to two-stage heating and one-step carbonization and activation under a protection of an inert gas, and cooling to room temperature to obtain an impurity-containing bio-oil light fraction-based porous activated carbon;

S2, grinding the impurity-containing bio-oil light fraction-based porous activated carbon obtained in step S1 and sieving for the first time, washing and stirring with a hydrochloric acid solution, then repeatedly washing and suction filtering with deionized water until a filtrate is neutral, so as to remove activator reaction products and impurities in the solid product, drying, grinding again and sieving for the second time, and obtaining the bio-oil light fraction-based porous activated carbon.

4. The method according to claim 1, wherein the mixed solution is stirred by a magnetic stirrer to obtain a uniform mixed solution.

5. The method according to claim 1, specifically comprising the following steps:

S1, firstly, preparing bio-oil obtained by pyrolysis of biomass, carrying out molecular distillation on the bio-oil to obtain the light fraction, then mixing the activator with the light fraction according to a predetermined mass ratio and stirring for a predetermined time to obtain a mixed homogeneous liquid of the light fraction and the activator, subjecting the mixed homogeneous liquid to two-stage heating and one-step carbonization and activation under a protection of an inert gas, and cooling to room temperature to obtain an impurity-containing bio-oil light fraction-based porous activated carbon;

S2, grinding the impurity-containing bio-oil light fraction-based porous activated carbon obtained in step S1 and sieving for the first time, washing and stirring with a hydrochloric acid solution, then repeatedly washing and suction filtering with deionized water until a filtrate is neutral, so as to remove activator reaction products and impurities in the solid product, drying, grinding again and sieving for the second time, and obtaining the bio-oil light fraction-based porous activated carbon.

6. The method according to claim 5, wherein in step S1, the mixed homogeneous liquid of the light fraction and the activator is obtained by adding the activator with a predetermined mass ratio to the light fraction, and stirring for 0.5-2 hours with a magnetic stirrer to obtain a uniform mixture.

7. The method according to claim 5, wherein in step S1, the inert gas is one or more selected from the group consisting of nitrogen, argon and helium.

8. The method according to claim 5, wherein conditions of the two-stage heating and the one-step carbonization and activation in step S1 are as follows: a first stage has a final heating temperature of 300-500° C., a heating rate of 2-10° C./min and a heating time of 0.5-3 hours, and a second stage has a final heating temperature of 700-900° C., a heating rate of 2-10° C./min and a heating time of 1-3 hours.

9. The method according to claim 5, wherein in step S2, after the sieving for the first time, the impurity-containing bio-oil light fraction-based porous activated carbon is washed with a 0.5-2 M hydrochloric acid solution, stirred by a magnetic force for 3-6 hours, and then repeatedly washed with deionized water and filtered by suction.

10. The method according to claim 1, wherein the step of carbonization and chemical activation comprises two-stage heating.

11. The method according to claim 10, specifically comprising the following steps:

S1, firstly, preparing bio-oil obtained by pyrolysis of biomass, carrying out molecular distillation on the bio-oil to obtain the light fraction, then mixing the activator with the light fraction according to a predetermined mass ratio and stirring for a predetermined time to obtain a mixed homogeneous liquid of the light fraction and the activator, subjecting the mixed homogeneous liquid to two-stage heating and one-step carbonization and activation under a protection of an inert gas, and cooling to room temperature to obtain an impurity-containing bio-oil light fraction-based porous activated carbon;

S2, grinding the impurity-containing bio-oil light fraction-based porous activated carbon obtained in step S1 and sieving for the first time, washing and stirring with a hydrochloric acid solution, then repeatedly washing and suction filtering with deionized water until a filtrate is neutral, so as to remove activator reaction products and impurities in the solid product, drying, grinding again and sieving for the second time, and obtaining the bio-oil light fraction-based porous activated carbon.

12. The method according to claim 1, wherein the light fraction is obtained by preparing bio-oil from a cellulose biomass by fast pyrolysis and then subjecting the bio-oil to the molecular distillation.

13. The method according to according to claim 12, wherein the cellulose biomass is one or more selected from the group consisting of fruit shell, sawdust, straw, bamboo, walnut shell, poplar sawdust and corn straw.

14. The method according to according to claim 1, wherein the molecular distillation adopts a molecular distillation pressure of 10-3,000 Pa and a working pressure of a short-range distiller of 0.001-1 mbar.

15. The method according to according to claim 1, wherein the light fraction comprises the following components in parts by mass: 15-50 parts of water, 20-30 parts of acids, 5-15 parts of ketones, 5-10 parts of aldehydes and 10-20 parts of monophenols.

16. The method according to according to claim 1, wherein the activator is one or more selected from the group consisting of potassium hydroxide, sodium hydroxide, potassium carbonate, sodium carbonate, potassium bicarbonate and sodium bicarbonate.

17. The method according to claim 1, wherein a mass ratio of the activator to the light fraction is 1:22 to 1:3.

* * * * *